United States Patent [19]

Mukerjee

[11] 3,887,533

[45] June 3, 1975

[54] PROCESS FOR THE MANUFACTURE OF A LIGHT COLORED THERMOSTABLE CHLORINATED POLYOLEFIN

[75] Inventor: Ambar Nath Mukerjee, Gersthofen, Germany

[73] Assignee: Hoechst Aktiengesellschaft, Frankfurt am Main, Germany

[22] Filed: Dec. 12, 1973

[21] Appl. No.: 424,201

[30] Foreign Application Priority Data
Dec. 21, 1972 Germany............................ 2262535

[52] U.S. Cl....... 260/88.2; 260/94.9 H; 260/96 HA; 260/93.7
[51] Int. Cl. ............................................ C08f 27/03
[58] Field of Search.......... 260/96 HA, 88.2, 94.9 H

[56] References Cited
UNITED STATES PATENTS

| | | | |
|---|---|---|---|
| 3,168,499 | 2/1965 | Orthner et al. ................ | 260/79.3 R |
| 3,227,781 | 1/1966 | Klug et al. .......................... | 260/897 |
| 3,813,370 | 5/1974 | Gambaretto et al............ | 260/88.2 S |

Primary Examiner—Joseph L. Schofer
Assistant Examiner—A. L. Clingman
Attorney, Agent, or Firm—Connolly and Hutz

[57] ABSTRACT

Light colored and thermostable chloropolyolefins are obtained by chlorinating a polyethylene or a polypropylene or a copolymer of ethylene with an $\alpha$-olefin having 3 to 6 carbon atoms in a fluidized or moving bed with gaseous chlorine in the presence of a small amount of a carboxylic acid, an alkali metal or alkaline earth metal salt, or an anhydride thereof.

5 Claims, No Drawings

PROCESS FOR THE MANUFACTURE OF A LIGHT COLORED THERMOSTABLE CHLORINATED POLYOLEFIN

The present invention relates to a process for the manufacture of a light colored thermostable chloropolyolefin.

A great number of publications does exist concerning the chlorination of polyolefins. There have been described many variations of the chlorination process in solution, in suspension and in the solid state in a fluidized or a moving bed.

In all processes it must be taken into account that the chlorination reaction is strongly exothermal, i.e., when contacted with chlorine the polyolefins may carbonize, burn, change their color or be damaged in another way. In the chlorination in a liquid medium it is not very difficult to control the heat balance, whereas in the fluidized bed or fluidized layer chlorination the dissipation of the reaction heat constitutes a very serious technical problem. Industrially less important processes dilute the product to be chlorinated with inert substances, for example pulverulent sodium chloride, talc, silicic acid and the like, but in practice it is preferred to use chlorine diluted with inert gases, such as nitrogen, carbon dioxide and hydrogen chloride. As fluidized layer or fluidized bed chlorinations are preferably carried out with circulation of the gases, hydrogen chloride formed in the reaction is generally used as inert fluidization or carrier gas to facilitate gas processing as far as possible.

It has been found that the quality as to color and thermostability of polymers and copolymers of ethylene and propylene chlorinated in a fluidized layer or fluidized bed is often insatisfactory when the chlorination is carried out at a temperature near the melting point of the polymer and/or in the presence of large amounts of hydrogen chloride and/or polymers are used containing detectable double bonds.

It is the object of the present invention to carry out the fluidized layer or fluidized bed chlorination of homopolymers of ethylene or propylene and copolymers of ethylene in such a manner that products are obtained which have a satisfactory color and thermostability combined with the other desired properties.

The present invention therefore provides a process for the manufacture of a light colored thermostable chloropolyolefin by chlorinating pulverulent polyethylene, polypropylene or a copolymer of ethylene with a straight chain or branched α-olefin having from 3 to 6 carbon atoms, the polymer having a molecular weight in the range of from about 20,000 to 2,000,000, with gaseous chlorine in the fluidized layer or moving bed, which comprises carrying out the chlorination in the presence of from 0.01 to 3.0% by weight, calculated on the amount of polymer to be chlorinated and uniformly distributed in the polyolefin powder, of a. a saturated aliphatic mono- or dicarboxylic acid having 4 to 50 carbon atoms, or
b. a mononuclear aromatic, possibly alkyl-substituted monocarboxylic acid having 7 to 23 carbon atoms, or
c. an aliphatic hydroxi-monocarboxylic acid having 2 to 18 carbon atoms in the molecule, or
d. an aliphatic hydroxi-dicarboxylic acid having 4 to 10 carbon atoms, or
e. an aromatic, possibly alkyl-substituted hydroxicarboxylic acid having 7 to 11 carbon atoms, or
f. an alkali metal or alkaline earth metal salt of any one of the acids named sub (a) to (e), or
g. an anhydride of an aliphatic monocarboxylic acid having 4 to 50 carbon atoms, or
h. an anhydride of an aliphatic dicarboxylic acid having 4 to 50 carbon atoms, or
i. an anhydride of an aromatic monocarboxylic acid having 7 to 23 carbon atoms, or
j. an anhydride of an aromatic dicarboxylic acid having 8 to 23 carbon atoms.

Suitable starting materials for the chlorination are pulverulent homopolymers of ethylene or propylene or copolymers of ethylene and straight chain or branched α-olefins having from 3 to 6 carbon atoms, such as propylene, n-butene, i-butene, n-pentene, n-hexene, in an amount of up to about 5% by weight, preferably 0.1 to 4% by weight. The particle size of the polymers is in the range of from about 40 to 500 microns, preferably 250 to 500 microns. They have been produced by high pressure, medium pressure or low pressure polymerization processes and have a molecular weight of from about 20,000 to 2,000,000. Low pressure polyethylenes to be chlorinated are preferably those having an eta-red value of from 0.5 to 20 dl/g, advantageously 1.0 to 5.0 dl/g, the latter range corresponding to a molecular weight of about 34,000 to 270,000.

Aliphatic carboxylic acids to be used are saturated aliphatic mono- and dicarboxylic acids having 4 to 50 carbon atoms in a straight or branched chain. There are mentioned by way of example butyric acids, valeric acids, caproic acid, caprylic acid, capric acid, lauric acid, myristic acid, palmitic acid, stearic acid, behenic acid, cerotic acid, and montanic acid. From among the monocarboxylic acids those having 16 and more carbon atoms and more particularly 16 to 30 carbon atoms are preferred. Preferred dicarboxylic acids are those having 4 to 10 carbon atoms, such as succinic acid, glutaric acid, adipic acid, azelaic acid, sebacic acid. Higher dicarboxylic acid mixtures may also be used, for example α,ω-octadecanoic acid, α,ω-docosanoic acid, α,ω-tricosanoic acid and α,ω-tetracosanoic acid. Adipic acid proved to be particularly suitable.

By aromatic monocarboxylic acids having 7 to 23 carbon atoms, preferably 7 to 16 carbon atoms there are preferably understood mononuclear acids such as benzoic acid and the alkyl substitution products thereof having preferably 1 to 6 alkyl carbon atoms. There are mentioned by way of example toluic acid, ethyl-propyl- or butyl benzoic acid. Alternatively, several alkyl radicals preferably having 1 to 6 carbon atoms may be bound to the nucleus.

Appropriate aliphatic hydroximonocarboxylic acids are those having 2 to 18 carbon atoms in the molecule in a straight or branched chain, for example glycolic acid, lactic acid, hydroxibutyric acids, hydroxivaleric acids, hydroxipivalic acid and hydroxistearic acid. Suitable hydroxidicarboxylic acids are those having 4 to 10 carbon atoms, for example hydroxisuccinic acid (malic acid), hydroxiadipic acid, hydroxisebacic acid. Especially good results are obtained with glycolic acid, lactic acid and malic acid. Suitable aromatic hydroxicarboxylic acids have 7 to 11 carbon atoms and derive from benzoic acid and its alkyl substitution products preferably having 1 to 3 alkyl carbon atoms. The OH group is directly bound to the aromatic nucleus. There are mentioned by way of example hydroxibenzoic acids, hydroxitoluic acids, hydroxiethyl-, hydroxipropyl- and hydroxibutylbenzoic acids.

Besides the aforesaid acids, the alkali metal and alkaline earth metal salts thereof, preferably the latter, can be used as additives, for example barium laurate, calcium laurate, barium stearate, calcium stearate, calcium montanate, calcium glutarate, calcium adipate, sodium adipate, calcium sebacate, calcium benzoate, calcium p-tert.-butylbenzoate, potassium montanate, lithium stearate, calcium glycolate, sodium hydroxistearate or sodium salicylate.

By anhydrides of aliphatic or aromatic mono- or dicarboxylic acids compounds are understood which are obtained by intermolecular or intramolecular condensation of saturated or unsaturated carboxylic acids, possibly also hydroxi-acids. Suitable anhydrides of aliphatic monocarboxylic acids having 4 to 50 carbon atoms, preferably 16 to 30 carbon atoms, and dicarboxylic acids having 4 to 10 carbon atoms are, for example, maleic anhydride, succinic anhydride, adipic anhydride, valeric anhydride, stearic anhydride, cerotic anhydride, and montanic anhydride. Anhydrides of aromatic monocarboxylic acids having 7 to 23 carbon atoms, preferably 7 to 16 carbon atoms, are, for example, benzoic anhydride, or the alkyl substitution products thereof preferably having 1 to 6 alkyl carbon atoms, for example toluic anhydride. There may also be used anhydrides of aromatic hydroxicarboxylic acids having 7 to 11 carbon atoms, such as hydroxibenzoic acid anhydride and the alkyl substitution derivatives thereof preferably having 1 to 3 alkyl carbon atoms. As anhydride of aromatic dicarboxylic acids having 8 to 23 carbon atoms, preferably 8 to 12 carbon atoms, orthophthalic anhydride is named. In general, the inner anhydrides of aromatic ortho-dicarboxylic acids are preferred.

Maleic anhydride, succinic anhydride and benzoic anhydride give especially good results.

The amount of carboxylic acid, salt or anhydride thereof to be added in the chlorination is in the range of from 0.01 to 3.0% by weight, preferably 0.1 to 1.0% by weight, calculated on the amount of polymer to be chlorinated.

The polyolefin powder can be mixed with the additive of the invention in various ways. The substances can be mechanically mixed prior to chlorination, the additives can be blown into the chlorination mixture with the aid of a carrier gas prior to or at the beginning of chlorination, or the acids, salts or anhydrides thereof can be applied to the polymers in the form of a solution in a solvent which is inert with respect to the polyolefin and can be readily evaporated, for example chloroform, ethers, alcohols and optionally water. The mixing procedure may also be combined with a preliminary thermal treatment of the polymer, as described for example in German Offenlegungsschrift 1,720,800.

The chlorination is carried out in known manner in the fluidized or moving bed at a temperature, depending on the nature of the polymer, in the range of from 20° to 160°C, preferably 60° to 145°C. The reaction mixture is kept in motion by the reaction gas possibly diluted with inert gas and/or mechanically.

The chlorination may also be effected by a percussive fluidized bed process in which the reaction gas, optionally diluted with an inert gas, is passed through the loose pulverulent material to be chlorinated at a speed which is insufficient for fluidization and fluidization is brought about by introducing an inert gas in percussions separately from the reaction gas. In this process the reaction gas is preferably introduced from above and the inert gas is blown in percussively from below and during the intervals between the individual percussions the off gas is withdrawn from below the reaction space (cf. German Offenlegungsschriften 1,667,048 and 1,811,059). It is also possible to carry out a fluidized bed chlorination in the presence of readily vaporizable liquids which are resistant towards chlorine and evoporate at a temperature of from −50° to +80°C, for example carbon tetrachloride, fluorinated derivatives of halomethanes or ethanes or liquid chlorine (cf. German Offenlegungsschrift 2,151,138). Polyolefins having been subjected to a thermal pre-treatment for 5 to 300 minutes in the absence of oxygen at a temperature which is approximately 2° to 20°C below the crystallite melting point, can also be used (cf. German Offenlegungsschrift 1,720,800). The thermal pre-treatment may optionally be carried out in the presence of a solid, for example silicic acid. Finally, the polyolefins can be chlorinated in admixture with solid substances such as talc, silica gel, barium sulfate, polyvinyl chloride, polyfluorohydrocarbons, or the like. Another known chlorination process is effected in the presence of high energy ionizing radiation or substances yielding radicals, for example peroxides, azonitriles and the like. The chlorination can be carried out discontinuously as well as continuously, without pressure or under pressure.

In general, the products obtained by the process of the invention contain 10 to 50% by weight, preferably 25 to 45% by weight of chlorine.

The chlorination according to the invention in the presence of carboxylic acids, the salts or anhydrides thereof is especially suitable when operating at a temperature in the viscinity of the melting range of the polymer to obtain preponderantly amorphous chlorination products having especially interesting technical properties which are used, for example, as plasticizers for polyvinyl chloride masses and as synthetic rubbers.

The products obtained in the process of the invention differ from chlorination products obtained without the specified additives and having a tendency to color in that they have a very light color and that they keep this color even after processing at high temperatures. Their thermostability is not detrimentally affected, on the contrary it is slightly improved. The following examples illustrate the invention.

EXAMPLE 1

A vertical glass tube having a diameter of 80 mm and a height of 1,000 mm, into which a gas-permeable porous plate was inserted in the lower part, was used as chlorination apparatus. Approximately 100 mm above the plate means to measure the temperature were installed in the reaction space and close by a closable tube was provided, through which the chlorination additives could be blown in. The apparatus was surrounded by a jacket for heating or cooling.

600 grams of low pressure polyethylene having an eta red value of 1.0 dl/g; a particle size of less than 125 microns, a latent heat of fusion of 41.0 cal/g according to differential thermoanalysis (DTA) and an ultimate melting point of 134°C, were heated in the presence of 0.25% by weight of finely dispersed silicic acid, during the course of 105 minutes to about 118°C and then kept at that temperature for 15 minutes. After cooling the polymer was transferred into the chlorination apparatus and reacted with fluidization with a mixture of 1 part by volume of chlorine and 4 parts by volume of hydrogen chloride, whereby the temperature rose from 23°C to 40°C within 15 minutes. At that temperature and after having reached an internal temperature of 50°C, 60°C, 100°C and 110°C each time 0.5 g of calcium stearate was blown into the reaction mixture through the closable tube. After a chlorination period of 165 minutes altogether, during the course of which the chlorination temperature had been gradually raised to 135°C, the chlorinated product was blown out and cooled with nitrogen.

A pure white chlorination product having a chlorine content of 38.7% was obtained.

Comparative Example

The chlorination was carried out under the conditions specified in Example 1 but without the addition of calcium stearate.

The slightly yellowish chlorination product obtained had a chlorine content of 36.0%.

EXAMPLE 2

In the apparatus described in Example 1, 670 grams of low pressure polyethylene having an eta red value of 1.2 dl/g, a particle size of 40 to 800 microns, a latent heat of fusion of 42.0 cal/g and an ultimate melting point of 136°C, which had been thermally treated without the addition of silicic acid, were chlorinated under the conditions of Example 1. After having reached an internal temperature of 40°C and 70°C each time 0.5 gram of calcium stearate, and at 50°C and 80°C each time 0.25 gram of silicic acid (to avoid deposits on the wall of the chlorination tube) were blown in. The highest chlorination temperature was 137°C. The almost white chlorination product had a chlorine content of 30.8%.

Comparative Example

The chlorination was carried out under the same conditions but without addition of calcium stearate. The chlorination product having a chlorine content of 30.2% showed a yellowish color.

EXAMPLE 3

670 grams of low pressure polyethylene having an eta red value of 4.2 dl/g, a particle size of 40 to 500 microns, a latent heat of fusion of 45.2 cal/g and an ultimate melting point of 140°C were chlorinated under the conditions of Example 2, with the exception that the final chlorination temperature was 141°C.

The product obtained had a chlorine content of 41.6% and showed a white color.

EXAMPLES 4 and 5

Each time 670 grams of low pressure polyethylene as defined in Example 3 were chlorinated under the conditions of Example 2, in one case in the presence of 1.0 g of calcium stearate and, in the other, of 1.5 g of calcium stearate. The final chlorination temperature was 141°C. The chlorination products having a chlorine content of 39.6 and 43.6%, respectively, were purely white.

Comparative Example

The polyethylene as defined in Example 3 was chlorinated under the conditions of Example 2 but without addition according to the invention. The final chlorination temperature was 140°C. The chlorination product had a chlorine content of 38.3% and had a dark yellow color.

EXAMPLE 6 to 9

Each time 670 grams of thermally treated low pressure polyethylene as defined in Example 2 were chlorinated under the conditions of that example. The final chlorination temperature was 136.5°C. Before the polyethylene was filled into the chlorination tube it was mechanically mixed with (a) 1.0 gram of barium laurate, (b) 1.5 grams of calcium p-tert-butyl benzoate, (c) 1.0 gram of calcium p-tert-butyl benzoate and (d) 1.0 gram of benzoic acid. All chlorination products obtained were purely white, their chlorine contents were 32.5%, 36.4%, 36.4% and 32.7%, respectively.

EXAMPLE 10

The chlorination was carried out as described in Examples 6 to 9 using the polyethylene of Example 3 having an eta red value of 4.2 dl/g. 1.5 grams of calcium p-tert-butyl benzoate were added. The final chlorination temperature was 143°C. The pure white product has a chlorine content of 39.3%.

EXAMPLE 11

A solution of 1.0 gram of adipic acid in 20 ml of water was uniformly sprayed on to 670 grams of heat treated low pressure polyethylene as used in Example 2. The product was filled into the reaction tube and chlorinated under the conditions of Example 2. The final chlorination temperature was 137°C. The white chlorination product obtained had a chlorine content of 37.2%.

EXAMPLE 12

670 grams of polypropylene having an eta red value of 7.0 dl/g and a particle size of 40 to 300 microns, which had been intimately mixed in a mixer with 1.5 grams of adipic acid, were chlorinated in the apparatus described in Example 1 with a mixture of 1 part by volume of chlorine and 4 parts by volume of hydrogen chloride while the temperature was slowly raised to 100°C and kept at that level for 20 minutes. After having blown out and cooled with a nitrogen current a pure white product having a chlorine content of 11.5% was obtained.

Comparative Example

A chlorination product prepared in the same manner without the addition of adipic acid had a chlorine content of 10.2% and showed a yellowish color.

EXAMPLE 13

2,000 grams of low pressure polyethylene having an eta red value of 1.0 dl/g, a particle size of 40 to 500 microns, a latent heat of fusion of 37.8 cal/g according to differential thermoanalysis (DTA) and an ultimate melting point of 134°C were thermally treated according to DOS 1,720,800 at 122°C in a nitrogen current in the presence of 0.25% weight of finely dispersed silicic acid. After cooling, 600 grams of the product were transferred into the chlorination apparatus and treated with fluidization with a mixture of 1 part by volume of chlorine and 4 parts by volume of hydrogen chloride, whereby the temperature rose from 20°C to 45°C within the course of 20 minutes. At 45°C and after having reached an internal temperature of 60°C, 80°C and 100°C each time 0.5 gram of maleic anhydride were blown into the reaction mixture through the closable tube. After a chlorination time of 3 hours altogether, during the course of which the chlorination temperature had been gradually raised to 137°C, the reaction product was blown out and cooled with a nitrogen current. A pure white powder having a chlorine content of 37.8% was obtained.

EXAMPLE 14

600 grams of the heat treated polyethylene of Example 13 were mixed with 1.5 grams of phthalic anhydride, the mixture was transferred into the apparatus described in Example 1 and chlorinated under the conditions of Example 13. The highest chlorination temperature was 136°C; a white chlorination product having a chlorine content of 33.0% was obtained.

Comparative Example

The heat treated polyethylene of Example 13 was chlorinated under the conditions of Example 14, but without the use of an additive. The yellowish product obtained had a chlorine content of 33.5%.

EXAMPLE 15

1,500 grams of low pressure polyethylene having an eta red value of 1.2 dl/g, a particle size of 40 to 800 microns, a latent heat of fusion of 42.0 cal/g and an ultimate melting point of 135°C were heat treated as described in Example 13 in the presence of 0.1% of finely dispersed silicic acid. 600 grams of the heat treated polyethylene powder were mixed with 1.5 grams of succinic anhydride and 0.5 gram of silicic acid and the mixture was chlorinated in the apparatus described in Example 1 with 4 parts by volume of HCl and 1 part by volume of Cl. During the course of 135 minutes the chlorination temperature was raised from about 60°C to 137°C and chlorination was continued for approximately 5 minutes at the high temperature, whereupon the reaction product was blown out and cooled with a nitrogen current. A white chlorination product having a chlorine content of 32.4% was obtained.

A comparative experiment without the use of an additive yielded a yellow product having a chlorine content of 32.9%.

EXAMPLE 16

1,500 grams of low pressure polyethylene having an eta red value of 1.2 dl/g, a particle size of 40 to 500 microns, a latent heat of fusion of 44.0 cal/g and an ultimate melting point of 136°C were thermally treated as described in Example 13 but without the addition of silicic acid.

600 grams of the heat treated polyethylene were mixed with 1.5 grams of glycolic acid and 2.0 grams of finely dispersed silicic acid and the mixture was chlorinated in the apparatus described in Example 1 (ratio of HCl to Cl = 4 : 1 parts by volume). During the course of 150 minutes the chlorination temperature was raised from 60° to 145°C, whereupon the chlorination was continued for 5 minutes at the high temperature. The chlorination product had a chlorine content of 34.7% and was purely white.

Comparative Example

The experiment of Example 16 was repeated without the additive according to the invention. The product obtained had a chlorine content of 35% and was dark yellow.

EXAMPLE 17

1,500 grams of low pressure polyethylene having an eta red value of 4.2 dl/g, a particle size of 40 to 500 microns, a latent heat of fusion of 45.2 cal/g and an ultimate melting point of 140°C were subjected to a heat treatment in the presence of 0.2% of finely dispersed silicic acid.

A solution of 1.5 grams of malic acid in 20 ml of distilled water were uniformly sprayed on to 600 grams of the thermally treated product which was then chlorinated under the conditions of Example 16. The final chlorination temperature was 143°C.

The pure white chlorination product had a chlorine content of 39.3%.

Comparative Example

The polyethylene as used in Example 17 was chlorinated under the conditions of Example 16 but without the additive according to the invention.

The dark yellow chlorination product had a chlorine content of 38.3%.

The following Table indicates the essential properties of the chlorination products. The color was determined visually and with a spectrophotometer according to DIN 5033 with a rolled sheet 1 mm thick of a stabilized mixture of 30 grams of the respective chloropolyolefin and 180 grams of suspension polyvinyl chloride. The thermostability was measured by rolling a mixture of 40 grams of chloropolyolefin, 160 grams of suspension polyvinyl chloride and 2 grams of stabilizer (barium-cadmium laurate) until black stripes of decomposition occurred. The double bonds in the starting material were determined by infra-red spectroscopy.

Referring to the Table:

Table

| Example | Starting material | | | | chlorination product | | |
|---|---|---|---|---|---|---|---|
| | type [1] | double bonds [2] | | | color visually | color [3] with spectrophotometer | thermostability (min.) | % chlorine |
| | | a | b | c | | | | |
| 1 | I | 0 | 0 | 0 | white | 7 | 34 | 38.7 |
| comparison | I | 0 | 0 | 0 | yellowish | 23 | 34 | 36.0 |
| 2 | II | 0 | b | c | almost white | 16 | 41 | 30.8 |
| comparison | II | 0 | b | c | yellowish | 25 | 41 | 30.2 |
| 3 | III | a | b | c | white | 12 | — | 41.6 |
| 4 | III | a | b | c | white | 2 | — | 39.6 |
| 5 | III | a | b | c | white | 1 | 38 | 43.6 |

Table—Continued

| Example | Starting material | | | | | chlorination product | | |
|---|---|---|---|---|---|---|---|---|
| | type [1] | double bonds [2] | | | color visually | color [3] with spectro-photometer | thermosta-ability (min.) | % chlorine |
| | | a | b | c | | | | |
| comparison | III | a | b | c | dark yellow | >28 | 23 | 38.3 |
| 6 | II | O | b | c | white | 9 | 41 | 32.5 |
| 7 | II | O | b | c | white | 2 | 42 | 36.4 |
| 8 | II | O | b | c | white | 4 | 42 | 36.4 |
| 9 | II | O | b | c | white | 7 | 41 | 33.7 |
| 10 | III | a | b | c | white | 5 | 38 | 39.3 |
| 11 | II | O | b | c | white | 9 | 41 | 37.2 |
| 12 | IV | — | — | — | white | 7 | — | 11.5 |
| comparison | IV | — | — | — | yellowish | 22 | — | 10.2 |
| 13 | I | O | b | c | white | 6 | 36 | 37.8 |
| 14 | I | O | b | c | white | 1 | 38 | 33.0 |
| comparison | I | O | b | c | yellowish | 18 | 34 | 33.5 |
| 15 | II | O | b | c | white | 3 | 43 | 32.4 |
| comparison | II | O | b | c | yellow | 25 | 40 | 33.0 |
| 16 | II | O | b | c | white | 5 | 40 | 34.7 |
| comparison | II | O | b | c | dark yellow | >28 | 31 | 35.0 |
| 17 | III | a | b | c | white | 1 | 37 | 39.3 |
| comparison | III | a | b | c | dark yellow | >28 | 23 | 38.3 |

[1] I = low pressure polyethylene having an eta red value of 1.0 dl/g
II = low pressure polyethylene having an eta red value of 1.2 dl/g
III = low pressure polyethylene having an eta red value of 4.2 dl/g

[2] Double bonds present in the starting material are
a = transvinylene groups
b = vinyl groups
c = vinylidene groups
o = none

[3] Classification: 1 = white, 20 = yellowish

What is claimed is:

1. In a process for the manufacture of a light colored thermostable chloropolyolefin by chlorinating pulverulent polyethylene, polypropylene or a copolymer of ethylene with a straight chain or branched α-olefin having 3 to 6 carbon atoms, the molecular weight of the polymer being in the range of from about 20,000 to 2,000,000, with gaseous chlorine in the fluidized or moving bed, possibly after a thermal treatment of the polymer, the improvement of carrying out the chlorination in the presence of 0.01 to 3.0% by weight, calculated on the amount of polymer to be chlorinated and uniformly dispersed therein, of a compound selected from the group consisting of
   a. a saturated aliphatic mono- or dicarboxylic acid having 4 to 50 carbon atoms,
   b. a mononuclear aromatic, possibly alkyl-substituted, monocarboxylic acid having 7 to 23 carbon atoms,
   c. an aliphatic hydroxi-monocarboxylic acid having 2 to 18 carbon atoms in the molecule,
   d. an aliphatic hydroxi-dicarboxylic acid having 4 to 10 carbon atoms,
   e. an aromatic, possibly alkyl-substituted, hydroxicarboxylic acid having 7 to 11 carbon atoms,
   f. an alkali metal or alkaline earth metal salt of any one of the acids named sub (a) to (e),
   g. an anhydride of an aliphatic monocarboxylic acid having 4 to 50 carbon atoms,
   h. an anhydride of an aliphatic dicarboxylic acid having 4 to 50 carbon atoms,
   i. an anhydride of an aromatic monocarboxylic acid having 7 to 23 carbon atoms, and
   j. an anhydride of an aromatic dicarboxylic acid having 8 to 23 carbon atoms.

2. The process of claim 1, wherein a saturated monocarboxylic acid having 17 to 30 carbon atoms or an alkali metal or alkaline earth metal salt thereof is used.

3. The process of claim 1, wherein a saturated aliphatic dicarboxylic acid having 4 to 10 carbon atoms or an alkali metal or alkaline earth metal salt thereof is used.

4. The process of claim 1, wherein an aromatic, possibly alkyl substituted, monocarboxylic acid having 7 to 16 carbon atoms or an alkali metal or alkaline earth metal salt thereof is used.

5. The process of claim 1, wherein ortho-phthalic anhydride is used as anhydride of an aromatic dicarboxylic acid.

* * * * *